Patented Feb. 23, 1954

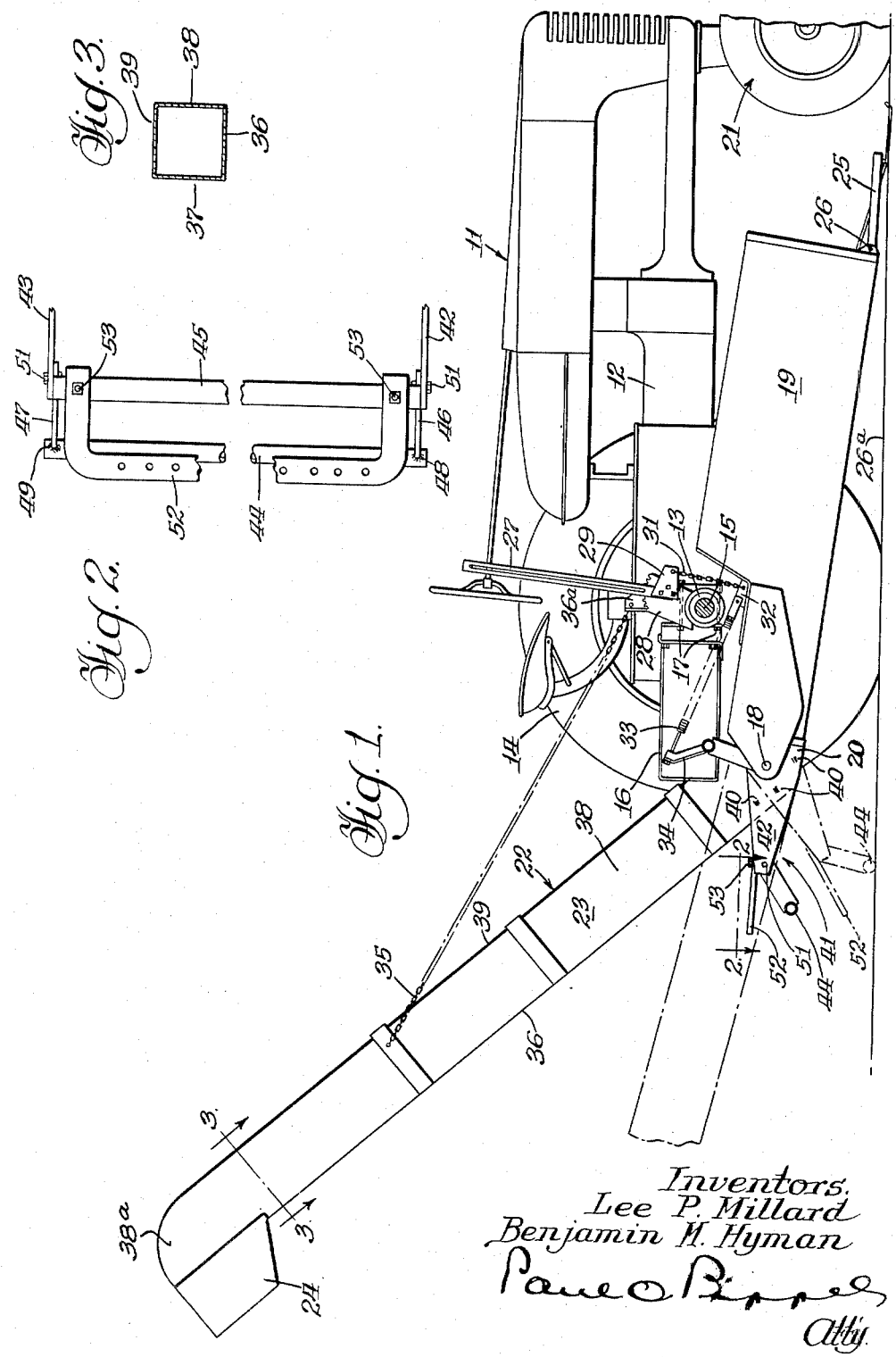

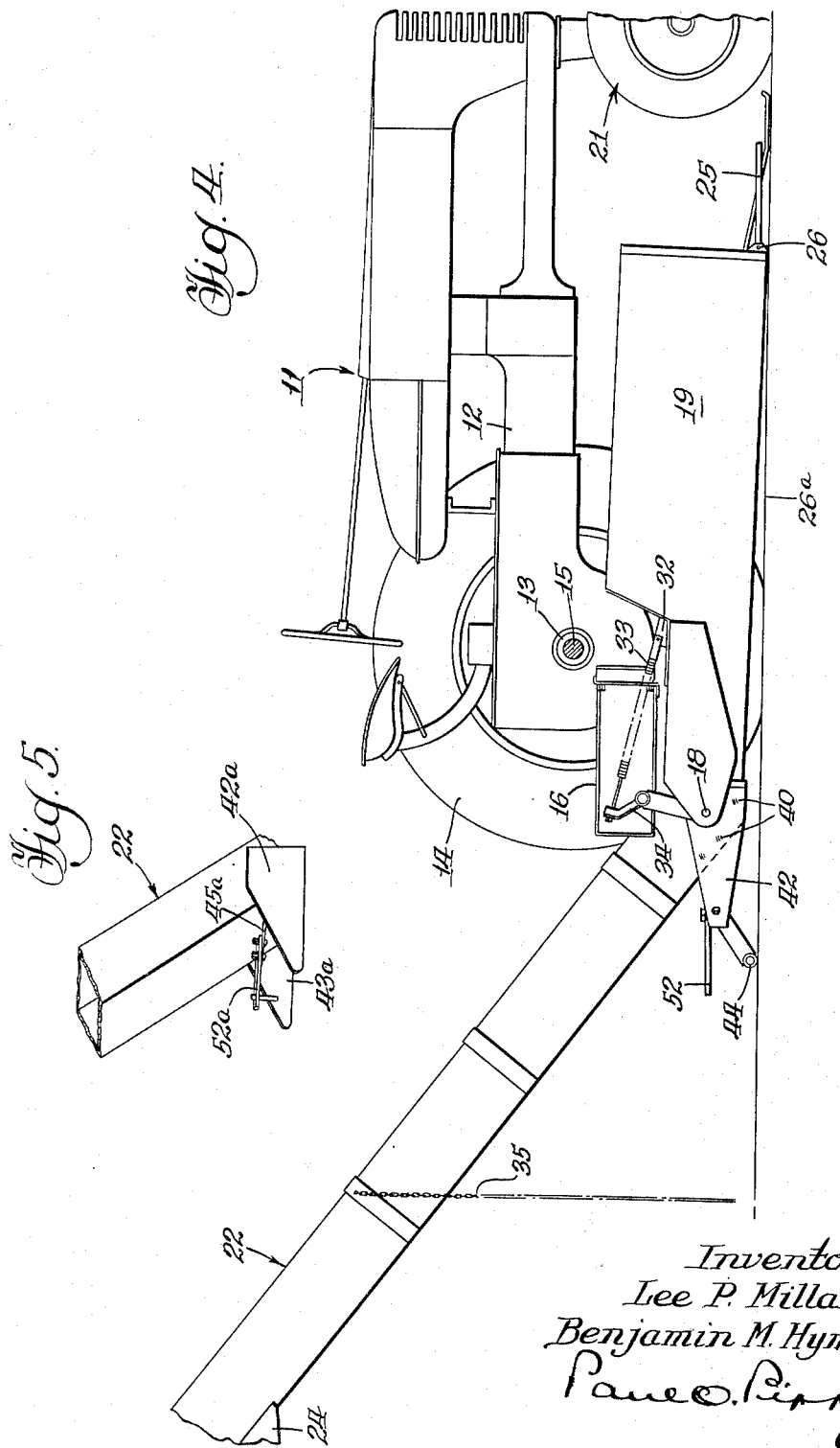

2,669,821

UNITED STATES PATENT OFFICE 2,669,821

LIFTING MEANS FOR TRACTOR-MOUNTED EQUIPMENT

Benjamin M. Hyman, East Moline, and Lee P. Millard, Chicago, Ill., assignors to International Harvester Company, a corporation of New Jersey Application January 18, 1951, Serial No. 206,542

4 Claims. (Cl. 56—11)

This invention concerns tractor mounted equipment having articulately connected components, and more particularly relates to means for lifting the equipment by means actuated by relative movement of such components to facilitate attachment to and detachment from the tractor.

Numerous kinds of tractor mounted equipment are sufficiently massive that the process of attaching and detaching to and from the tractor involves the use of props or lifting devices for temporarily supporting the equipment in the position which it occupies relatively to the tractor. The present invention is utilized in connection with such equipment having articulately associated components of which one is detachably connectable with the tractor and of which the other is movable relatively to the one for actuating a supporting instrumentality whereby it becomes effective for supporting the one component during the process of securing or loosening the connection with the tractor. An object of this invention is the provision of a fulcrum structure constrained for movement with one of the articulately connected equipment components in a manner that the fulcrum structure can be caused to engage the ground pursuant to an initial pivoting of this component and to thereafter enable this component to effect a prying action across the fulcrum structure pursuant to further pivoting thereof and thereby lift and support the other component while it is secured to or loosened from its connection with the tractor.

A further object is the provision of a simplified support in the form of a fulcrum structure mounted upon one of two articulately connected tractor-mounted equipment components so that by manipulation of this component the equipment can be supported upon the fulcrum structure preparatory to the tractor being driven to or from a position in which the equipment can be attached to or detached from such tractor.

A further object is the provision of fulcrum-equipped tractor-mounted apparatus of the above character and wherein the apparatus is so constructed and balanced with respect to the position of the fulcrum structure thereof that the apparatus will remain in a lifted condition upon the fulcrum structure without continued manual force of an attendant, and thereby adapting the apparatus to be utilized by a single attendant for mounting or dismounting it with respect to a tractor.

The above and other desirable objects inherent in and encompassed by the invention will be more readily comprehended after reading the ensuing description and the appended claims with reference to the annexed drawings, wherein:

Fig. 1 is a side elevational view with parts broken away of a tractor and of an articulately connected crop harvester unit and elevator therefor mounted upon the tractor and having a preferred form of the present invention incorporated into the structure thereof, the nearest traction wheel of the tractor being removed to facilitate illustration of the equipment and the means of attaching it to a rear axle housing of the tractor.

Fig. 2 is an enlarged fragmentary view taken horizontally upon the line 2—2 of Fig. 1, illustrating a drawbar and improved fulcrum structure associated with the tractor-mounted equipment.

Fig. 3 is a transverse sectional view taken on the line 3—3 of Fig. 1, illustrating the transverse configuration of a crop elevator frame of the tractor-mounted equipment.

Fig. 4 is a view similar to Fig. 1, but illustrating the equipment dismounted from the tractor.

Fig. 5 is a fragmentary perspective view looking forwardly toward the rear side of a crop elevator having a modified form of the fulcrum structure and drawbar mounting constituting a modification of this invention.

Referring first to Figs. 1 through 4, there is shown a tractor 11 having a body 12 which extends forwardly from transversely extending rear axle housings 13 of conventional construction. One of the axle housings 13 is shown in each of Figs. 1 and 4. One of the two traction wheels 14, at the far side of the tractor is shown while the corresponding wheel at the nearest side of the tractor has been removed to clarify illustration of other parts of the apparatus. A wheel driving axle 15 is contained in each of the axle housings 13.

A frame structure 16 is detachably mounted upon the rear axle housings 13 by means of bolts 17. Frame 16 contains pivot means in the form of a drive shaft 18 journaled therein and driven by power take-off mechanism, not shown, associated with the tractor. The shaft 18 pivotally supports the rear end of a crop-gathering unit 19 which, in the present instance, is a cotton plant stripping unit. A sprocket, not shown, is constrained for rotation with the shaft 18 within the unit 19 to drive moving parts thereof. Details of a similar drive shaft and crop-gathering unit are disclosed in U. S. Patent No. 2,532,065.

It is standard practice to utilize two of the units 19 respectively upon opposite sides of the tractor body 12 for harvesting respective rows which are passed between by steering truck 21 which supports the front end of the tractor body 12. The crop harvested by the crop-gathering units 19 is discharged into the lower end of an elevator structure 22 comprising an elongated frame 23 pivotally supported at its lower end 20 upon the shaft 18 and thereby articuately associated with the crop-gathering units 19. The crop introduced into the lower end of the elevator structure 22 from the harvesting or gathering units 19 is elevated and discharged through a spout 24.

Each of the crop gathering units 19 has a vine lifter device 25 pivotally connected to its front end at 26. These vine lifters provide no support for the front ends of the units 19. However, adjustable support means for maintaining the front ends of the units 19 out of contact with the ground surface 26a includes a hand-operated lever 27 pivotally mounted with respect to a quadrant 28 and having an arm 29 constrained for pivotal movement with the lever. A chain 31 connects the lever-operated arm 29 with a bracket 32 upon the harvester unit. By pulling back upon the lever 27 and thereby pivoting this lever and the arm 29 counter-clockwise, the chain 31 will be caused to pull upwardly on the crop-gathering unit 19 while pivoting it about the shaft 18 and determining minimum elevation for the front end of the unit above the ground surface. A helper spring 33 is connected between the bracket 32 and a second bracket 34 upon the frame 16.

The elevator structure 22 is normally maintained in an upwardly and rearwardly inclined position by a chain 35 connected between said structure and a tractor mounted bracket 36a. The frame 23 of the elevator structure comprising the side walls 36, 37, 38 and 39 (Fig. 3), when in this inclined position has upper and lower opposite ends 38a and 20, respectively, a lower and rearward side 36, opposite sides 37, 38 and a top side 39. A fulcrum structure 41 includes plate-like arms 42 and 43 secured by welding 40 respectively to said opposite sides 38 and 37 of the elevator frame adjacent to the lower end portion of the elevator structure and projecting horizontally rearwardly in parallel planes respectively contiguous to said opposite sides of the elevator frames. A fulcrum frame unit, consisting of a tubular ground-engaging member 44 and a bar 45 having transverse end extensions 46 and 47 connected to end portions of the member 44 by welding at 48 and 49, is attached to rear end sections of the plate-like arms 42 and 43 by bolts 51. A bale-type drawbar 52 is mounted upon the cross bar 45 where it is secured by bolts 53.

Dismounting of the apparatus from the tractor is accomplished by detaching the lower end of the chain 35 from the bracket 36a to enable the attendant to lower the elevator structure 22 into the dot-dash-line position shown in Fig. 1. Such lowering or downward swinging of the elevator structure places the fulcrum member 44 against the ground 26a, thereby developing a moment about the point of engagement of this member 44 with the ground as the elevator structure prys as a first-class lever to exert upward force through the pivot means 18 upon the frame 16 and thereby substantially cancels the effect of gravitational force by the entire equipment 19, 16, 22 upon the attaching bolts 17, whereby these bolts can be easily loosened and detached by the attendant. The position of the transverse fulcrum member 44 with respect to the pivot means 18 and the center of mass of the elevator structure 22 is such that this elevator structure will be effective for maintaining the attaching frame 16 and the rear end portion of the crop-harvesting unit 19 elevated without the attendant exerting a downward force upon the elevator structure. Consequently the attendant can concentrate his attention and effort upon the task of detaching the frame 16 from the rear axle housings 13 and detaching the quadrant lever structure 27, 28, 29 and the lifting chain 31 from the tractor and from the unit 19. These operations will completely isolate the equipment 19, 16, 22 from the tractor so the operator can next exert an upward force on the elevator structure 22 to lower the frame 16 and the rear end portion of the crop-gathering unit 19 while the fulcrum member 44 remains in engagement with the ground. This will place the equipment in the condition illustrated in Fig. 4.

Such lowering of the rear end portion of the crop-gathering units 19 provides clearance thereabove with respect to the rear axle housings 13 of the tractor so the tractor may be driven forwardly away from the equipment.

The position of the center of the mass of the elevator structure 22 and the magnitude of this mass is such with reference to the positions of the fulcrum member 44 and the pivot means 18 that the elevator structure will occupy the dot-dash line of position of Fig. 1 while holding the rear end portion of the crop-gathering unit elevated, and, alternatively will occupy the position illustrated in Fig. 4 with the rear end position of the crop-gathering unit lowered. This facility of the elevator structure is aided by the shifting of the center of the mass thereof from a relative rearward position with respect to the pivot means 18 in the dot-dash-line position of Fig. 1 to a relative forward position when more elevated in the position of Fig. 4.

The modified fulcrum structure and drawbar mounting means illustrated in Fig. 5 operates on the same principle as that described above in connection with Figs. 1 through 4. In this modified fulcrum structure the plate-like arms 42a, 43a corresponding to the arms 42, 43 in the first embodiment are adapted to engage the ground at their rear ends to provide fulcrum means across which the elevator structure can pry upwardly through the connection thereof with the crop-gathering unit. The structure is thus simplified in the respect of eliminating the parts 44, 46 and 47 of the first embodiment. A cross bar 45a extends between and is mounted upon the plate-like arms 42a and 43a for supporting a drawbar member 52a.

Having described a limited number of embodiments of the invention with the view of clearly and concisely illustrating the same, we claim:

1. For use with a tractor having a transversely projecting rear axle housing; the combination of a crop gathering unit having a rearward portion, means operatively connected with the rearward portion of said unit for detachably suspending the same from the axle housing, an elongated elevator structure projecting upwardly and rearwardly from the gathering unit rearward portion, means pivotally connecting a lower front end portion of the elevator structure with the rearward portion of the gathering unit for pivotal movement relatively thereto about a horizontal axis, ground engageable fulcrum means operatively connected with the elevator structure and spaced rearwardly from said axis to engage the ground and cause the eleavtor structure to pry upwardly on the rearward portion of the gathering unit attendant to downward swinging of the elevator structure about said axis.

2. The combination set forth in claim 1, wherein the fulcrum means is placed in a position lengthwise of the elevator structure that a first moment consisting of the product of the mass of the elevator unit and the horizontal distance between the center of such mass and the fulcrum structure is substantially equal to a second moment consisting of the product of the gravitational downward force of the crop gathering unit upon the pivotally connecting means and the horizontal distance between the fulcrum and said connecting means.

3. The combination of claim 2, wherein the first moment is dominated by the second moment while the elevator structure projects upwardly and rearwardly, and wherein the mass of the elevator structure is of a magnitude that an increase in the horizontal distance of its center of mass from the fulcrum pursuant to downward swinging of such structure about such fulcrum increases said first moment to a magnitude predominating over the second moment to maintain the downward swung status of elevator structure.

4. In crop harvesting apparatus for use on a tractor having an axle housing, the combination of a crop gathering unit having a rear end portion, mounting means operatively connected with a rearward portion of said unit for detachably mounting the same on the tractor beneath the axle housing and above the ground, an elongated crop elevator for receiving gathered crops from the gathering unit and having front and rear end portions, means pivotally connecting the front end portion of the elevator with the rear end portion of the crop gathering unit, means operatively connected with the elevator for releasably supporting the same to incline rearwardly and upwardly from the gathering unit while the rearward portion of such unit is mounted on the tractor, a fulcrum structure rigidly associated with the elevator and including a ground engageable portion disposed thereon rearwardly from the pivotal connection between the elevator and crop gathering unit while the elevator is in the inclined position but being engageable with the ground when the elevator is released by its supporting means and swung downwardly about the pivotal connection, thereby adapting the elevator to function as a lever exerting an upward force upon the crop gathering unit through the pivotal connection therewith.

BENJAMIN M. HYMAN.
LEE P. MILLARD.

References Cited in the file of this patent

UNITED STATES PATENTS

| Number | Name | Date |
|---|---|---|
| Re. 22,279 | Hyman et al. | Mar. 2, 1943 |
| 2,446,883 | Pool et al. | Aug. 10, 1948 |
| 2,477,980 | Hardy et al. | Aug. 2, 1949 |
| 2,532,065 | Hyman | Nov. 28, 1950 |
| 2,568,865 | Neighbour et al. | Sept. 25, 1951 |